United States Patent [19]

Hatch

[11] Patent Number: 5,052,696
[45] Date of Patent: Oct. 1, 1991

[54] COMPACT COMPRESSOR SEAL

[75] Inventor: Frederick R. Hatch, Ann Arbor, Mich.

[73] Assignee: Mather Seal Company, Milan, Mich.

[21] Appl. No.: 604,703

[22] Filed: Oct. 26, 1990

[51] Int. Cl.⁵ ............................................. F16K 41/02
[52] U.S. Cl. ...................................... 277/37; 277/47; 277/49; 277/152
[58] Field of Search ...................... 277/37, 47, 49, 152, 277/153

[56] References Cited

U.S. PATENT DOCUMENTS

| | | | |
|---|---|---|---|
| 4,284,281 | 8/1981 | Reinsma | 277/152 X |
| 4,432,557 | 2/1984 | Drucktenhengst | 277/153 |
| 4,575,104 | 3/1986 | Nagasawa | 277/153 |
| 4,588,195 | 5/1986 | Antonini et al. | 277/153 |
| 4,623,153 | 11/1986 | Nagasawa . | |
| 4,721,314 | 1/1988 | Kanayama et al. . | |
| 4,755,115 | 7/1988 | Akaike . | |
| 4,822,059 | 4/1989 | Shimasaki et al. . | |
| 4,834,397 | 5/1989 | Shimasaki et al. . | |
| 4,848,776 | 7/1989 | Winckler | 277/153 |
| 4,962,936 | 10/1990 | Matsushima | 277/37 |

FOREIGN PATENT DOCUMENTS 0275968  11/1989  Japan ................................. 277/152

Primary Examiner—William A. Cuchlinski, Jr.
Assistant Examiner—James K. Folker
Attorney, Agent, or Firm—Lawrence J. Shurupoff

[57] ABSTRACT

A shaft seal having a thin radial section is adapted for mounting within a small radial annular clearance space between a housing and a shaft. An elastomeric sealing member is bonded to an axially inner portion of the seal and a polytetrafluoroethylene sealing member is clamped to an axially outer portion of the seal.

4 Claims, 1 Drawing Sheet

COMPACT COMPRESSOR SEAL

FIELD OF THE INVENTION

The present invention relates in general to shaft seals and particularly relates to an air conditioner compressor seal having an elastomeric seal member bonded to a metal seal casing and a polytetrafluoroethylene (PTFE) seal member clamped to the casing against the elastomeric seal member.

DESCRIPTION OF PRIOR DEVELOPMENTS

Attention has recently been focused on reducing the size and weight of virtually every component used in an automobile in order to increase fuel economy. Efforts to reduce the size and weight of automotive air conditioning compressors have resulted in smaller envelopes within which the compressor shaft seals may be mounted. More particularly, the annular space between the compressor shaft and its surrounding housing has been radially downsized in recent designs thereby necessitating a more radially compact compressor shaft seal.

Although prior compressor shaft seals having a sealing lip or lips clamped within a metal casing have heretofore performed satisfactorily, attempts to use such clamped designs in radially compact annular spaces have not proved feasible. In such applications, there is insufficient radial support available to form a reliable seal between the metal seal casing and the seal lips. This problem is particularly acute in those prior designs which included both polytetrafluoroethylene (PTFE) and elastomeric sealing lips.

More particularly, prior compressor seal designs clamped or axially compressed a pair of sealing lips between radially extending flanges formed in an annular metal seal casing. The loss of available radial mounting space in modern automotive compressors necessitates a decrease in the size of the radial clamping surfaces available on the seal casings for securing the sealing lips to the casings. When a PTFE and an elastomeric sealing lip do not have sufficient radial clamping support, one or both lips may slip out or be squeezed out of the metal seal casing during the clamping operation.

In some compressor designs, there is simply insufficient radial space available for accommodating both the radial clamping flanges on the seal casings as well as the sealing lips which must extend radially from the clamping flanges. In this case, the clamping flanges actually abut and interfere with the sealing lips when the seal is installed over a compressor shaft. If the clamping flanges are shortened to avoid interference with the sealing lips, there is insufficient radial surface contact between the sealing lips and the clamping flanges to provide adequate retention of the sealing lips within the seal casing. In this case, the seal will either leak along the radial clamping surfaces or the sealing lips will begin to spin against the radial clamping surfaces causing leakage or will fall out of the seal casing.

Accordingly, a need exists for a radially compact shaft seal for use within radially limited annular seal mounting envelopes such as found in modern air conditioner compressor designs. This need is particularly acute in the case of compressor seals having both PTFE and elastomeric sealing lips mounted in tandem or axially sandwiched within a common seal casing.

SUMMARY OF THE INVENTION

The present invention has been developed to meet the needs noted above and therefore has as a primary object the provision of a radially compact air conditioner compressor seal which is structurally sound so as to prevent leaks due to loss of structural integrity between the seal casing and sealing members and which also prevents interference between the seal casing and sealing lips when the seal is placed in service around a rotating compressor shaft.

Briefly, the invention includes a stamped metal seal casing having a first elastomeric sealing lip bonded to an axially inner portion of the casing and a second polytetrafluoroethylene sealing lip clamped to an axially outer portion of the seal casing. The term "axially inner" refers to that axial portion of the seal closest to or facing the fluid being sealed, while the term "axially outer" relates to that axial portion of the seal closest to or facing the ambient. The first elastomeric lip is preferably bonded to both a radial surface of the casing as well as to an axial surface of the casing to ensure a secure leakproof bond therebetween. That portion of the first sealing lip which is bonded to a radial casing surface serves as an elastomeric gasket against which an axially inner face of annular PTFE wafer is clamped.

The axially outer face of the PTFE washer is clamped against an annular metal washer so as to provide a strong rigid secure mounting of the wafer between the washer and the first elastomeric sealing lip. Because the first elastomeric sealing lip is bonded to the metal casing, preferably along both axially and radially extending bonding surfaces, the seal casing need not extend radially inwardly for any significant radial extent as would be required with a purely mechanically clamped seal design requiring significant radial support and radial clamping surfaces.

In use, the second PTFE sealing lip extends under the radial surface of the seal casing to which the first elastomeric sealing lip is bonded and further extends beneath the axially and radially bonded portion of the first elastomeric sealing lip. Since the first elastomeric sealing lip does not require any significant radial casing support because of its axially extending bond with the seal casing, the first sealing lip may be positioned radially outwardly on the seal casing a sufficient distance to provide adequate radial clearance for the second PTFE lip to pass below it.

Moreover, the inner diameter of the seal casing itself may be located radially outwardly to a greater extent than with prior clamped designs yet still maintain its necessary outer dimension for seating within a housing bore so as to provide the required radial clearance space between the seal casing and the first and second sealing lips. The results in a seal having a relatively thin radial section and which provides adequate radial clearance between the seal casing and shaft to freely accommodate a pair of radially overlapped seal lips.

Since neither of the sealing lips need extend axially outwardly from the seal casing, the axially outer portion of the seal casing may extend radially inwardly for a significant distance without concern of interference with the sealing lips. This allows for the use of a metal washer having a relatively large radial inward extent to be clamped between the outer edge of the seal casing and the outer face of the second PTFE sealing lip. The washer provides significant support to the second PTFE sealing lip and prevents this lip from being blown axially outwardly during use by the high pressure refrigerant which may be sealed by the subject seal.

Various other objects, features and attendent advantages of the present invention will be more fully appreciated from the following detailed description when considered in connection with the accompanying drawings, in which the same reference numbers designate the same or corresponding parts throughout.

DETAILED DESCRIPTION OF THE PREFERRED EMBODIMENTS

Figure 1:
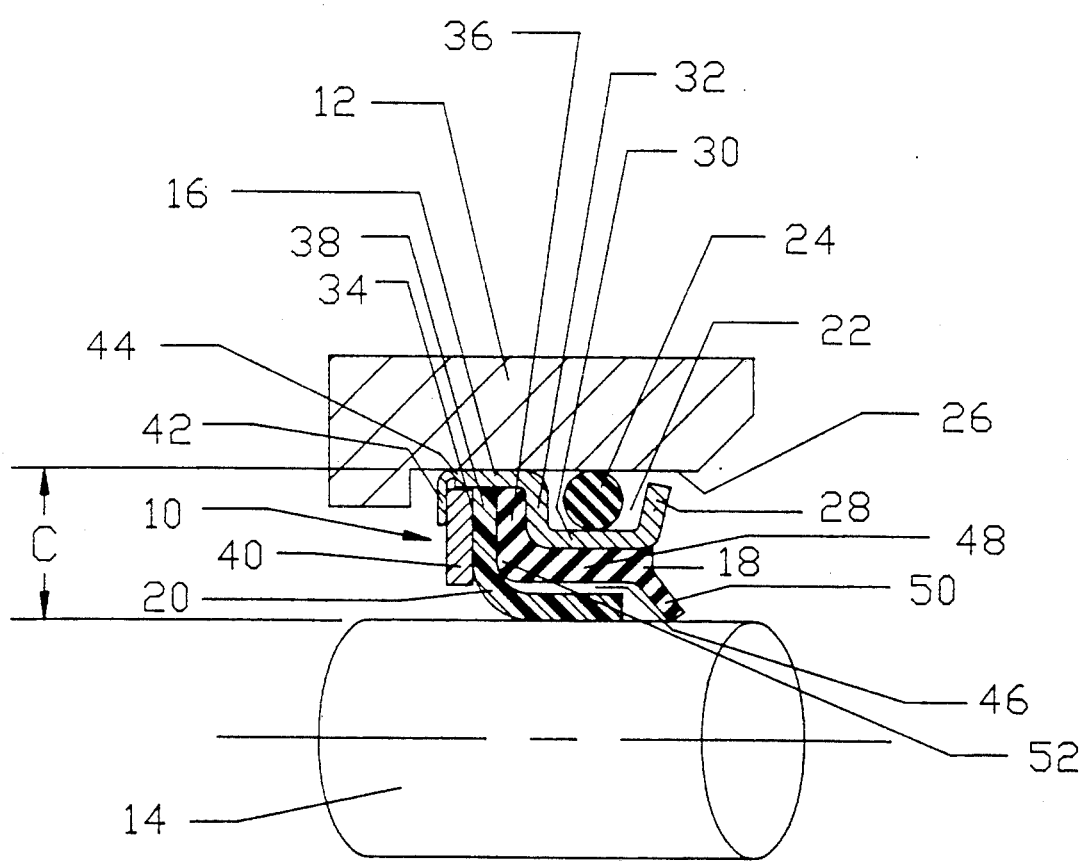
FIG. 1 is an axially sectioned view through an annular seal configured in accordance with the present invention.

The present invention will now be described in conjunction with the drawing which shows a shaft seal 10 adapted for use within a housing 12 such as an air conditioner compressor housing through which a rotary shaft 14 passes. Seal 10 includes a stamped metal unitary casing 16 which carries a first elastomeric sealing member 18 and a second sealing member 20 formed of a synthetic resin material such as PTFE. The first sealing member 18 is preferably bonded to the metal casing 16 in a known fashion while the second sealing member is clamped to the metal casing 16 in a known fashion.

Metal casing 16 defines an axially-inner radially outwardly facing channel 22 within which an elastomeric O-ring 24 may be mounted for sealing against the wall of bore 26 formed in housing 12. Channel 22 includes an axially-inner radially outwardly extending free end wall 28, an axially extending wall 30 and a radially extending central wall 32. Casing 16 also defines an axially-outer radially inwardly facing channel 34 within which a radially extending portion 36 of the first sealing member 18 is disposed.

Channel 34 also encloses a radially outer portion 38 of the second sealing member which is clamped securely against portion 36 of the first sealing member by an annular washer 40. Washer 40 is in turn clamped within channel 34 by a radially inwardly extending free end wall 42 of channel 34. A radially-outer axially-extending wall 44 interconnects end wall 42 with central wall 32.

As mentioned above, shaft seal 10 is designed for applications which allow for limited radial clearance C within an annular space between shaft 14 and housing 12. Clearance C can be as small as 0.17 inch or even less, yet seal 10 may be suitably scaled down to function effectively in such a small radial envelope. What allows for the small radial scale of seal 10 is the bonding of the first elastomeric sealing member 18 to the metal casing 16 such that a relatively large bonding surface is formed along the axially extending inner wall 30 of channel 22.

Since bond strength is achieved along an axially-extending surface, little radial bonding surface is needed, if any. Thus, the relatively long radially extending clamping walls of prior clamped sealing lip designs may be eliminated thereby allowing for a radially thin sectioned shaft seal. Because central wall 32 need not provide a radial clamping surface for the first elastomeric seal member 18, the axially-extending wall 30 of channel 22 may be located radially outwardly of shaft 14 a sufficient distance to allow for a free axially-extending clearance space 46 between the first and second sealing members as mounted in use.

Sealing member 18 includes a main body portion 48 bonded to the inner face of wall 30 and a frustoconical lip portion 50. Radial portion 36 of sealing member 18 is preferably bonded to central wall 32 and serves as a gasket against which the outer portion 38 of the second sealing member 20 is compressed. The radial inner portion 52 of the axially outer end of main body portion 48 which extends radially inwardly of central wall 32 serves to radially support and clamp sealing member 20 within channel 34. Clamping rigidity for sealing member 20 is provided by metal washer 40 which axially forces the second sealing member 20 against radial portion 36 of sealing member 18 via the crimping force provided by free end wall 42.

Obviously, numerous modifications and variations of the present invention are possible in light of the above teachings. It is therefore to be understood that within the scope of the appended claims, the invention may be practiced otherwise than as specifically described herein.

What is claimed is:

1. A compact shaft seal for use within an annular space defined between a housing and a shaft, said seal comprising:

a metal casing comprising a radially inwardly facing channel and a radially outwardly facing channel;

said radially inwardly facing channel having a radially inwardly extending free end wall, a radially-extending central wall and a radially outer axially-extending wall interconnecting said radially inwardly extending free end wall and said central wall;

said radially outwardly facing channel having a radially outwardly extending fee end wall and a radially inner axially-extending wall interconnecting said radially outwardly extending free end wall and said central wall;

an o-ring disposed in said radially outwardly facing channel;

an elastomeric sealing member bonded to said radially inner axially-extending wall and adapted to seal against said shaft; and a polytetrafluoroethylene sealing member clamped within said radially inwardly facing channel and adapted to seal against said shaft, said polytetrafluoroethylene sealing member, as mounted on a shaft being axially coextensive with a portion of said radially outwardly facing channel and axially coextensive with a portion of said elastomeric sealing member and defining an axially extending clearance space between said polytetrafluoroethylene sealing member and said elastomeric sealing member.

2. The seal of claim 1, wherein said elastomeric sealing member comprises a radially extending portion bonded to said central wall.

3. The seal of claim 2, wherein said polytetrafluoroethylene sealing member is clamped against said radially extending portion of said elastomeric sealing member.

4. The seal of claim 3, further comprising an annular washer clamped between said radially inwardly extending free end wall and said polytetrafluoroethylene sealing member.

* * * * *

UNITED STATES PATENT AND TRADEMARK OFFICE
CERTIFICATE OF CORRECTION

PATENT NO. : 5,052,696

DATED : October 1, 1991

INVENTOR(S) : Frederick R. Hatch

It is certified that error appears in the above-identified patent and that said Letters Patent is hereby corrected as shown below:

Column 4, line 36, claim 1, "fee" should read -- free --

Signed and Sealed this

Twenty-fifth Day of May, 1993

Attest:

MICHAEL K. KIRK

*Attesting Officer*   Acting Commissioner of Patents and Trademarks